United States Patent

Genzel et al.

[15] 3,671,718

[45] June 20, 1972

[54] METHOD AND APPARATUS FOR IDENTIFYING ARTICLES AND IDENTIFICATION SIGN THEREFOR

[72] Inventors: Hans-Ulrich Werner Genzel, Uster; Hans-Rudolf Hafeli, Seengen; Hans Robert Steiner, Rapperswil, all of Switzerland

[73] Assignee: Zellweger Ltd., Uster, Switzerland

[22] Filed: July 29, 1970

[21] Appl. No.: 59,116

[30] Foreign Application Priority Data

Aug. 20, 1969 Switzerland ..........................12606/69

[52] U.S. Cl.............235/61.11 E, 235/61.12 N, 250/219 DD

[51] Int. Cl...................G06k 7/10, G06k 19/04, E04g 17/00

[58] Field of Search..................235/61.11, 61.11 E, 61.11 C, 235/61.11 D, 61.12 R, 61.12 M, 61.12 C, 61.12 N, 61.7 B; 340/146.3 K; 250/219 DD

[56] References Cited

UNITED STATES PATENTS

| | | | |
|---|---|---|---|
| 3,171,020 | 2/1965 | Lord | 235/61.11 C |
| 3,074,634 | 1/1963 | Gamo | 235/61.11 E |
| 3,417,234 | 12/1968 | Sundblad | 235/61.11 E |
| 3,445,634 | 5/1969 | Lanes et al. | 235/61.11 E |
| 3,553,437 | 1/1971 | Boothroyd | 235/61.11 E |

*Primary Examiner*—Daryl W. Cook

*Attorney*—Kenyon & Kenyon Reilly Carr & Chapin

[57] ABSTRACT

The identification sign is formed with a starting code, an intermediate information code and end code. The starting and end codes are used in the code recognition logic to indicate when a valid configuration of a pulse sequence of the identification sign has been read either forwards or backwards by a trace of a reader. The recognition logic can be constructed to initiate reading out of a valid configuration for further processing either in dependence on a single trace or two traces passing through the center of the identification sign.

21 Claims, 18 Drawing Figures

United States Patent
Genzel et al.
[15] 3,671,718
[45] June 20, 1972
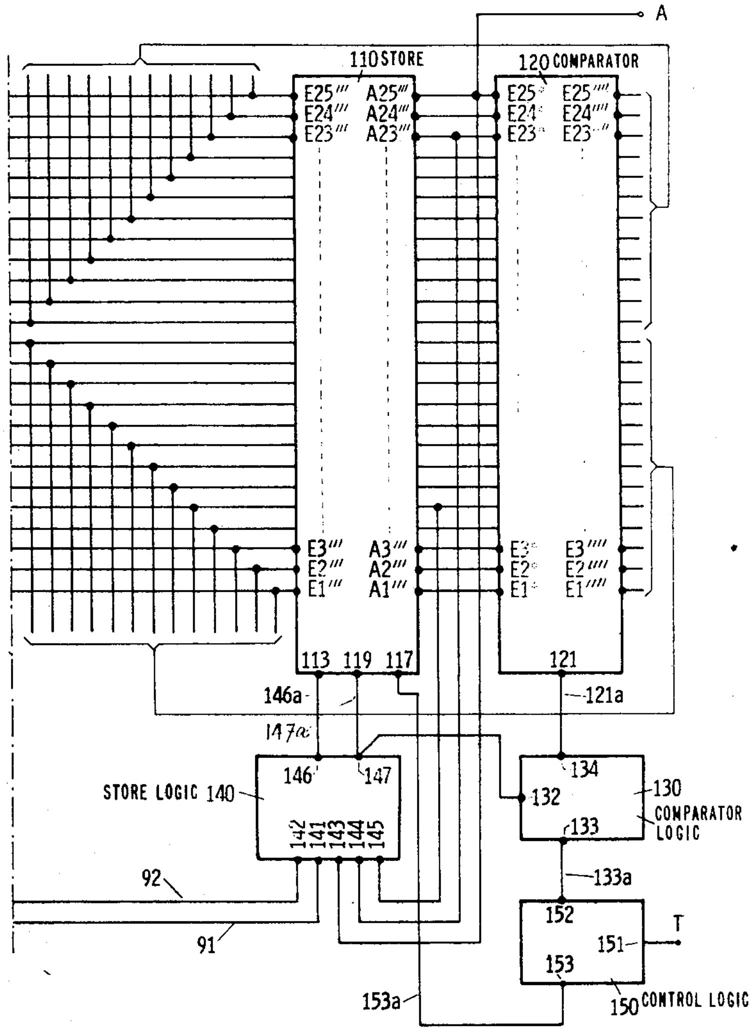

Patented June 20, 1972 3,671,718

15 Sheets-Sheet 1

INVENTORS
HANS-ULRICH W. GENZEL
HANS RUDOLF HÄFELI
HANS R. STEINER
BY
Kenyon & Kenyon Reilly Carr & Chapin
ATTORNEYS Patented June 20, 1972 3,671,718

15 Sheets-Sheet 2

INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS Patented June 20, 1972 3,671,718

15 Sheets-Sheet 5

INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS

INVENTORS
HANS-ULRICH W. GENZEL
HANS RUDOLF HÄFELI
HANS R. STEINER

BY
Kenyon & Kenyon Reilly Carr & Chapin
ATTORNEYS

Patented June 20, 1972 3,671,718

15 Sheets-Sheet 14

INVENTORS
HANS-ULRICH W. GENZEL
HANS RUDOLF HÄFELI
HANS R. STEINER
BY
Kenyon & Kenyon Reilly Carr & Chapin
ATTORNEYS INVENTORS
HANS-ULRICH W. GENZEL
HANS RUDOLF HÄFELI
HANS R. STEINER
BY
Kenyon & Kenyon Reilly Carr & Chapin
ATTORNEYS

METHOD AND APPARATUS FOR IDENTIFYING ARTICLES AND IDENTIFICATION SIGN THEREFOR

This invention relates to a method and apparatus for identifying articles, and more particularly to a method and apparatus for identifying articles of merchandise. Still more particularly, this invention relates to an identification sign for an article.

In the present context, the term "identification" is understood to mean the marking of articles with readable identification marks with subsequent retrieval of the information contained in the identification marks.

It is known that articles, especially goods for sale in shops and/or goods stored in warehouses, can be marked with special identification signs. Such signs can be used, for example, to express a serial number which, in turn, can be composed in such a way as to assign the identified articles to certain groups or subsidiary groups. Further information can also be contained in markings in or alongside the serial numbers. Examples of such further information include the location of articles, prices, packaging dates, latest selling dates, nominal values for certain properties of the articles, such as for example weight and/or weight tolerances, and the like. Since markings of this kind are applied, for example, to consumer goods and are read, for example, by a reader past which the articles move, it is of particular advantage to use markings which do not have to be aligned in any special way in regard to the conveying direction or in regard to the reading or scanning direction.

In the identification of consumer goods for example, it is important in regard to the dimensions of the smallest articles to be identified that the marking used should not take up any more space than is justified by its information content. However even in the case of relatively large articles, it is of advantage if the marking occupies only a small part of the surface of an article or its package. In this way, the marking would not interfere in any way with the appearance of the article and in addition, would leave enough space free, for example, for printing for publicity purposes, design, and the like.

In many cases, publicity factors also play a considerable part in the marking of articles, especially consumer goods, with identification signs. For this reason, markings which are able to accommodate a given amount of information in the smallest possible space, are of particular advantage. In addition to the information content, the size of a marking is governed, for example, by the resolving power of the associated scanning unit as well as by the structure and nature of the marking. For example, optical scanning techniques are distinguished by their particularly high resolving power. For this reason, the markings which can be scanned by optical techniques can have a very fine structure. However, in view both of the possible danger of contamination of the marking and/or of irregularities in the printing, an over fine structure of the marking and an excessively high resolving power of the scanning unit are of no practical value whatever.

If a specific resolving power for the marking and also for the scanning unit is established in a given application, and if on the other hand the maximum information content to be accommodated in the marking is also fixed, it is desirable to create a type of class of marking which is able to display the given information content in a minimum amount of space. In other words, it would be desirable to have a marking which is as compact as possible in relation to its information content.

However, the markings which have been used in the past have not provided an optimum solution in this respect.

Accordingly, it is an object of the invention to identify articles by a class of markings which are distinguished by the very limited amount of space that they require in relation to their information content.

It is another object of the invention to use identification markings that do not have to be specially aligned in a scanning plane in relation to the reading direction.

It is another object of the invention to accurately and efficiently retrieve the information contained in a marking for the purpose of recognizing an article provided with the marking.

It is another object to reduce the space required to accommodate an identification marking on an article of merchandise.

It is another object of the invention to use a code recognition logic in which the special configuration of a marking is taken into account.

It is another object of the invention to have a code recognition logic recognize the scanning direction from the sequence of scanning signals.

Briefly, the invention provides a method of identifying articles with the aid of markings supplied to these articles in which at least one marking is scanned along at least one direction and in which those sequences of the signal or impulse sequences obtained by scanning of the markings which have the correct configuration are recognized through the appearance of at least one special code section.

The method is distinguished by the fact that, during the scanning of a marking, the information contained in the marking is retrieved depending upon the position of the marking relative to the scanning direction. For example, the information is retrieved either when the marking is scanned only in the forward direction or only in the rear-ward direction. In addition, the correct bit sequence for the evaluation of at least one signal or pulse sequence of valid configuration obtained by scanning is determined from the position of at least one special code section of the signal or pulse sequence.

The method is further carried out where the movement of the marking relative to at least one scanning unit is not parallel to the scanning direction, the marking being oriented in any direction and position within the scanning range of the scanning unit.

The invention also provides an apparatus for identifying articles with the aid of at least one marking applied to these articles. The apparatus includes at least one scanning unit with an associated code recognition logic and is distinguished by the fact that the scanning direction is not parallel to the direction of the relative movement between the marking and the scanning unit. In addition, the apparatus includes a direction recognition logic for recognizing the scanning direction based on a pulse sequence obtained by scanning the marking or markings so as to accurately retrieve the information contained in the marking.

In one embodiment, the apparatus includes a code recognition logic which is formed of a shift register and a timing pulse generator while the direction recognition logic is formed of a forward recognition logic and a backward recognition logic. The shift register is connected to the reader to receive all of the impulse sequences therefrom in order and is also connected to the timing pulse generator to simultaneously receive timing pulses corresponding to the received impulse sequences. In addition, the shift register is connected to the forward and backward recognition logics to send signals thereto which indicate from which direction the valid configuration of an impulse sequence has been received in the shift register. In this embodiment, both the information in the impulse sequence and the direction of scanning are available for evaluation.

Upon the occurrence of a valid configuration of an impulse sequence in the shift register, the information code of the impulse sequence is emitted as an output from the shift register to suitable equipment, such as a comparator for further evaluation as is known.

In another embodiment, the apparatus relies on the reception of two consecutive valid configurations of impulse sequences to initiate evaluation of a stored impulse sequence. The apparatus includes a code recognition logic which is formed of a shift register and a timing pulse generator, as above, a direction recognition logic, an inversion logic, store, comparator and control logic. In addition, a store logic is connected to the store and direction recognition logic and a comparator logic is connected to the comparator, store logic and the control logic. This embodiment functions to release the information code only when two sequential impulse sequences are received which are each of a valid configuration. The inversion logic serves to invert the pulses generated from, for example, the backward scanning so as to have the impulses appear to have been caused by a forward scanning. Each pulse is then stored in sequence in the store and simultaneously fed to the comparator. The store comparator serves to monitor the condition of the store such that if the direction recognition logic indicates that a valid configuration is not present, the store logic CLEARS the store. Further, if the direction recognition logic indicates that a valid configuration is present but a predetermined time has elapsed since the pulse was stored the store logic ERASES the store. The comparator logic meanwhile serves to indicate a GOOD finding in the comparator to the control logic while suppressing the first such finding. In addition, should a second successive GOOD finding occur in the comparator logic within a given period of time, the logic emits a signal to the control logic which, in turn, actuates the store to initiate a series reading of a stored impulse sequence.

These and other objects and advantages of the invention will become more apparent form the following detailed description and appended claims taken in conjunction with the accompanying drawings in which:

FIG. 1*a* illustrates one form of a marking according to the invention;

FIG. 1*b* illustrates a first orientation of a marking along with a corresponding pulse sequence according to the invention;

FIG. 1*c* illustrates another orientation of the marking and corresponding pulse sequence of FIG. 1*b;*

FIG. 2*a* illustrates the position of a single scanning unit according to the invention;

FIG. 2*b* illustrates the positions of two scanning units according to the invention;

FIG. 3 illustrates a circuit diagram of a simple embodiment of a code recognition logic according to the invention;

FIGS. 3*a* and 3*b* illustrate a further code recognition logic according to the invention;

FIG. 4 illustrates a circuit diagram of a timing pulse generator used in the code recognition logic of FIGS. 3*a* and 3*b;*

FIG. 4*a* illustrates the pulse diagrams of the timing pulse generator shown in FIG. 4;

Figure 1A:
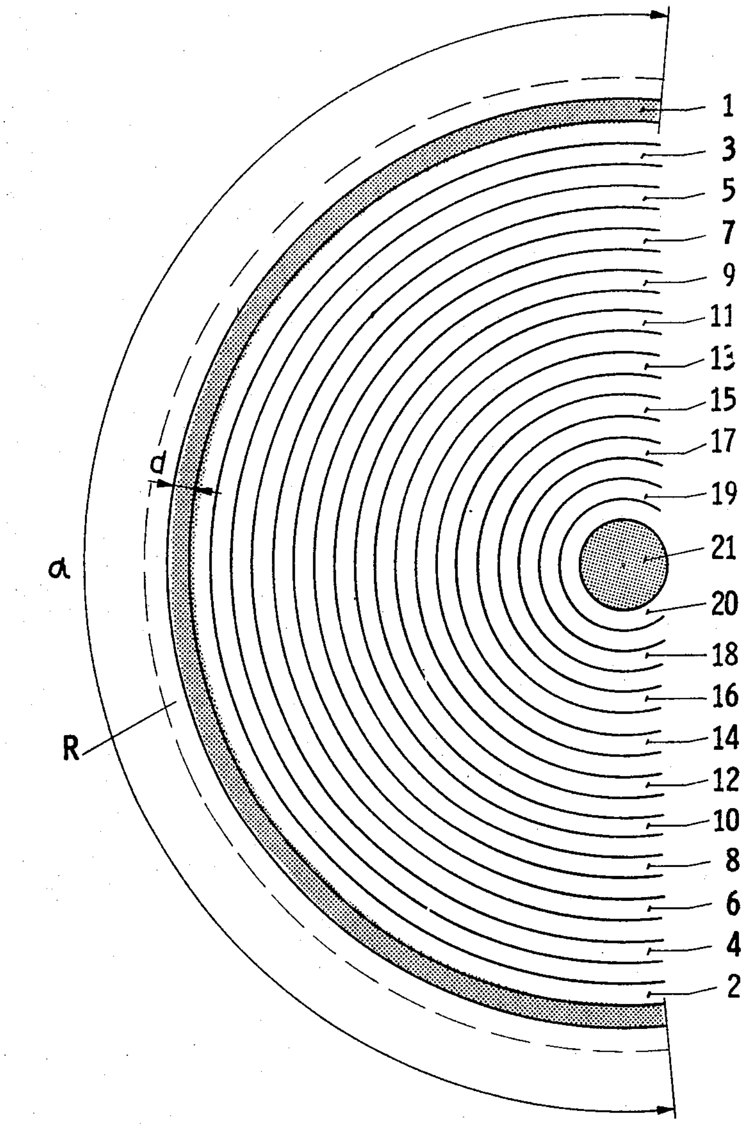

Referring to FIG. 1*a*, the marking in the form of an information carrier or identification sign consists of 20 ring sections, for example, of circular ring sectors 1 to 20, and a center point 21. In this case, a white circular ring sector always represents the binary value 1 while a black circular ring sector always represents the binary value 0. This information carrier is applied to a suitable surface of an article or package which is to be thereafter identified by the information carrier. In addition, the information carrier is positioned on the article so as to be scanned in a combined optical-electronic system as described, for example, below.

In the following, the circular ring sectors 1 to 20 are referred to as bit 1 to bit 20 with the bit length *d*. Outside the identification sign, there is a white peripheral zone of minimum width *d* which is used to represent an additional bit R. The combination of the bit R emanating from the white peripheral zone with bit 1 and bit 2, for example, is referred to as the starting code 25; bit 1, for example, always being black and bit 2 white.

The combination of bit 20, for example, with the center point 21 is referred to as an end code 27; in which case, bit 20, for example, is always white and the center point 21 always black. The center point 21 has a diameter of, for example, four bit lengths *d*. The bits 3 to 19 between the starting code 25 and the end code 27 are available for information transmission. Accordingly, $2^{17} = 131,072$ different conditions can be distinguished from one another, in other words 131,072 different information codes 26 can be formed.

The logic shown in FIGS. 3 to 9 is used to establish the presence of a valid configuration consisting of the starting code 25, the end code 27 and the information code 26 in between containing exactly 17 bits of information. The logic can be extended to any other configuration depending upon the particular application.

Figure 1B:
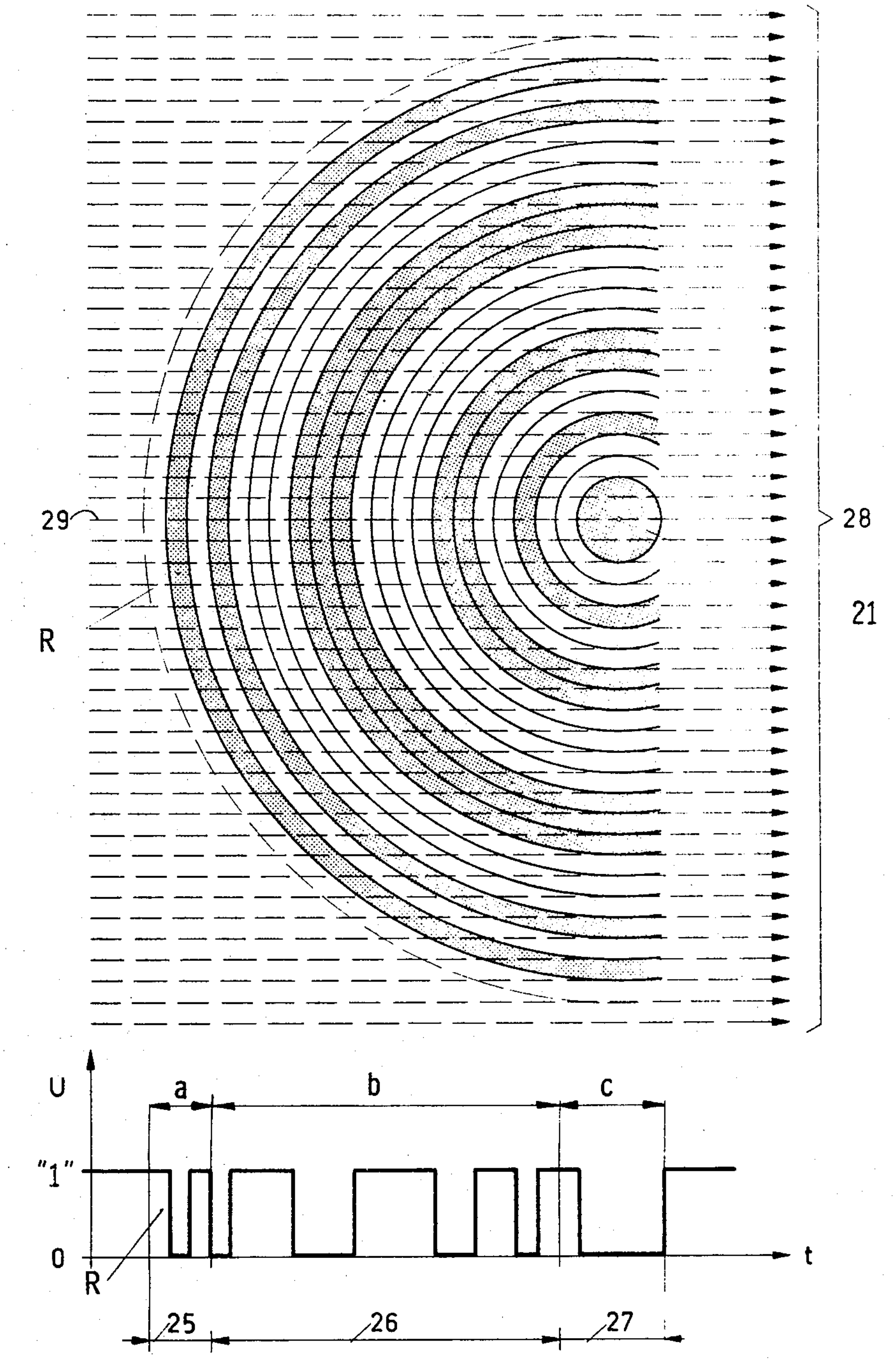

Assuming that the scanning system is a linear system with suppressed retrace or flyback, i.e. a system in which the moving beam of light only scans during a sweep motion, different cases arise for an identification sign of the kind shown in FIG. 1*a* depending upon the relative orientation of the sign to the scanning direction or to the scanning unit. For example, the identification sign may be oriented as shown in FIG. 1*b* in which case the scanning traces extend from left to right, producing a group 28 of scanning traces. One scanning trace 29 extends at least approximately through the middle of the center point 21 and produces a signal sequence of the kind shown at the bottom of FIG. 1*b*, for example, at the output end of the scanning unit. Proceeding from left to right of the signal sequence, the value 1 is initially obtained from the scanning of the white periphery bit R of the identification. The scanning of bit 1 next produces the value 0 because bit 1 is always intended to be a black circular ring sector. Thereafter, scanning of bit 2 since such is white produces a value 1 while the scanning of the bits 3 to 19 of the information code 26 produces the values as shown. Scanning of bit 20 which is always white produces the value 1. Final scanning of the center point 21 produces the value 0 over a time span equal to four bits.

Figure 1C:
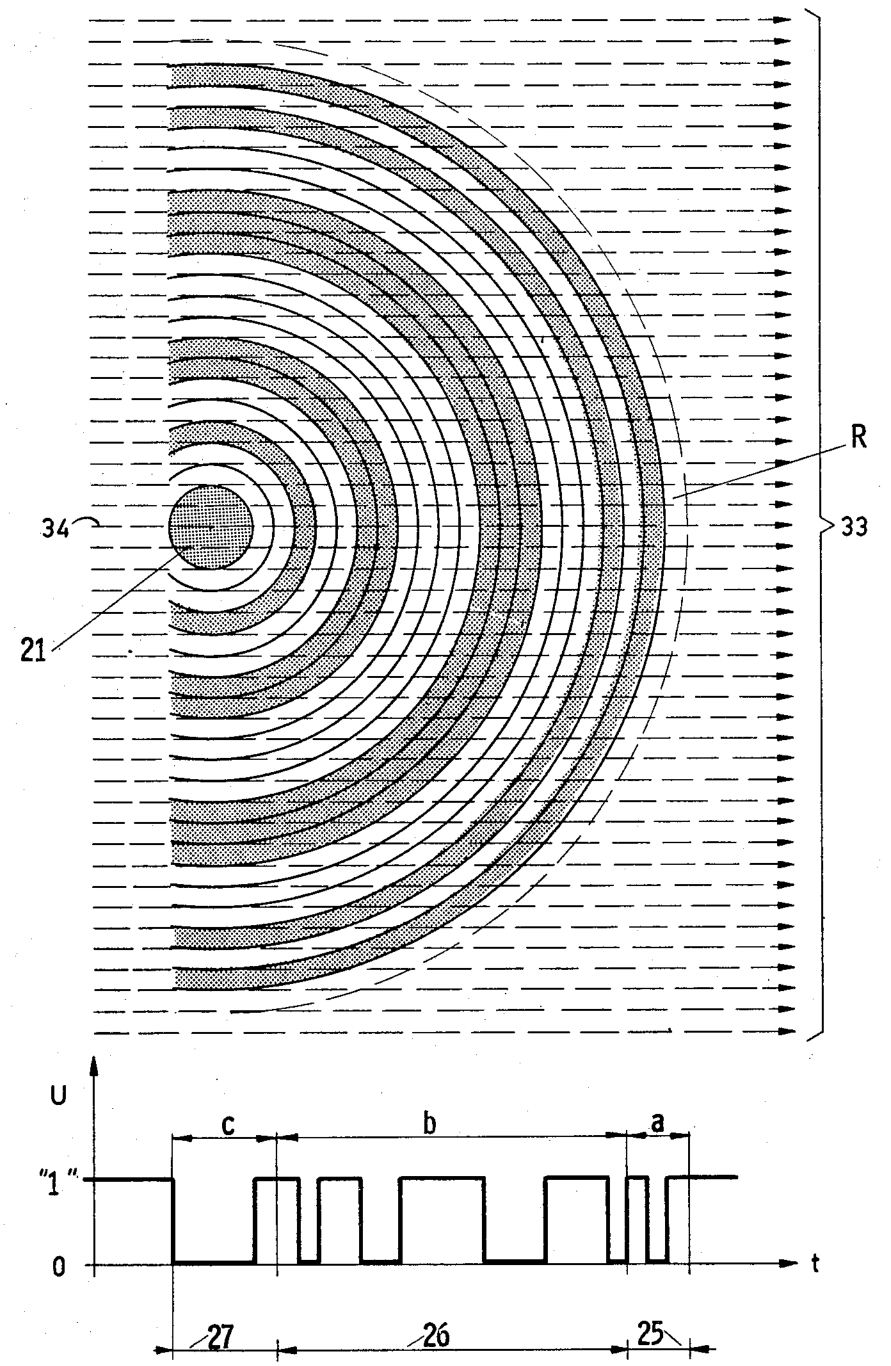

If by contrast the identification is oriented as shown in FIG. 1*c* upon passing by the scanning unit, a group 33 of scanning traces is formed of which the scanning trace 34 extends at least approximately through the middle of the center point 21. Scanning along the scanning trace 34 produces a signal sequence of the kind shown at the bottom of FIG. 1c. As seen in FIG. 1c, the scanning sequence is reversed in relation to that shown in FIG. 1*b*, being as follows: end code 27, information code 26 and finally the starting code 25. In this case, bits 1 to 20 are scanned in the opposite sequence. It will be explained below how this opposite sequence can also be correctly evaluated in a code recognition logic.

It is noted that even oblique scanning traces always produce at least one signal sequence of the kind shown in FIG. 1*b* or FIG. 1*c*. However, in addition to one correct scanning trace, i.e. one which extends at least approximately through the middle of the center point 21, several scanning traces which produce invalid scannings are also formed. It will be explained below how the correct scannings are identified.

The identification sign shown in FIG. 1*a*, 1*b* and 1*c* has an opening angle $\alpha$ of somewhat more than 180° and is intended for scanning in a single scanning direction. Compared with conventional identifications which extend over 360°, this in itself produces an approximately 50 percent reduction in the space requirement.

Figure 2A:
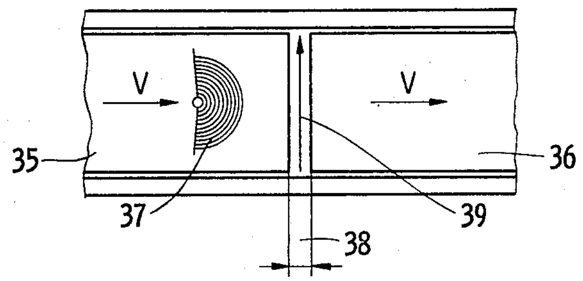

The necessary opening angle $\alpha$ of the identification sign is governed by the number of scanning units or scanning directions used. For example, referring to FIG. 2*a* wherein a single scanning unit is positioned between two conveyors 35, 36 (e.g. belt conveyors) which are of known construction and need not be further described, an article to be identified to which an identification 37 is applied is carried past a scanning zone 38 of the scanning unit at a velocity $v$ while the scanning unit scans the scanning zone 38 in the direction indicated by arrow 39.

In order to ensure the passing of at least one scanning trace through the identification sign and the center point 21 where there is only one scanning direction, the opening angle $\alpha$ must amount to at least 180°. In addition, the finite width of the scanning trace requires the opening angle $\alpha$ to be increased beyond 180° by an additional angular amount $k$.

Figure 2B:
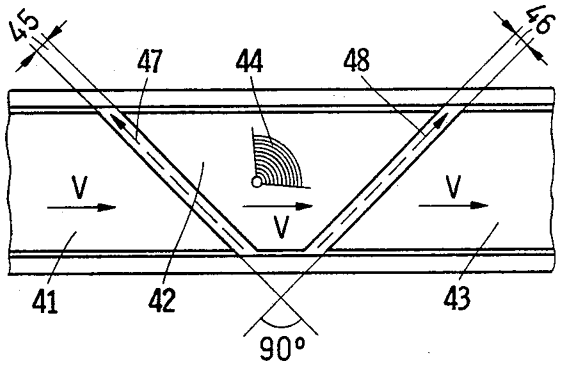

Referring to FIG. 2*b*, two scanning units having scanning directions which are offset through 90° relative to one another are used to scan the information sign. In this case, three conveyors 41, 42, 43 (for example, belt conveyors) carry the identification sign 44 past the scanning zones 45 and 46 of the scanning units at a speed $v$ so that the scanning units scan the scanning zones 45 and 46 in the direction indicated by arrows 47, 48, respectively. In order to enable the identification sign 44 to be read from any position on the conveyors 41, 42 and 43, the opening angle $\alpha$ of the identification sign must amount to at least 90° depending upon the width of the scanning trace. In an arrangement with two scanning directions, therefore, it is possible to reduce the space required to accommodate the identification sign to about one quarter of that of an identification sign extending over 360°.

Generally speaking, scanning in several directions enables the necessary opening angle $\alpha$ to be reduced in accordance with the following equation:

$$\alpha = (180°/n) + k$$

in which $\alpha$ is the opening angle of the identification sign in [ ° ], $n$ is the number of scanning directions used, and $k$ represents additive constants governed by the width of the scanning trace in [ °].

In order to carry out the optical scanning any suitable known code reader can be used. For example, a code reader which produces a so-called light curtain by means of a beam of light which moves periodically along a parallel path can be used. This curtain of light in turn produces a scanning trace on the identification sign travelling thereby so that more or less light is reflected depending upon the color and reflecting properties of the particular point at which the beam of light impinges. An electrical signal sequence, for example, an impulse sequence, can then be produced from the light reflected during scanning by known photoelectric converters. Since this impulse sequence is based on the scanning of the different surface components, for example, the white and black bits, the content of the identification sign is present in the impulse sequence.

It is of course also possible to use other known scanning units. For example, a medium for known magnetic recording can be used in place of a medium responding to optical rays for displaying the identification sign and the scanning can be carried out by known magnetic techniques. Further, the identification sign can also be applied to an article, for example, by stamping a material such as packing cardboard or plastic films or the like for this purpose. In this case, scanning is carried out by a probe which sweeps over the identification sign in contact therewith and which is linked to a known type of electromechanical or electromagnetic converter.

It is pointed out that the scanning of only a single article to be identified generally produces a whole group of scanning traces and hence signal sequences of which, for example, only one or only a few have a valid configuration, i.e. both the complete starting code 25, the complete information code 26 and the complete end code 27. All the other signal sequences emanate from scanning traces which, although passing through the identification sign, do not intersect the center point 21 of the middle of the point 21. Scanning traces which run outside the identification sign are also formed. These latter scanning traces may sweep over, for example, printing applied to the packing of the article to be identified and although they also produce signal sequences these signal sequences do not contain the information expressed by the identification sign.

Figure 3:
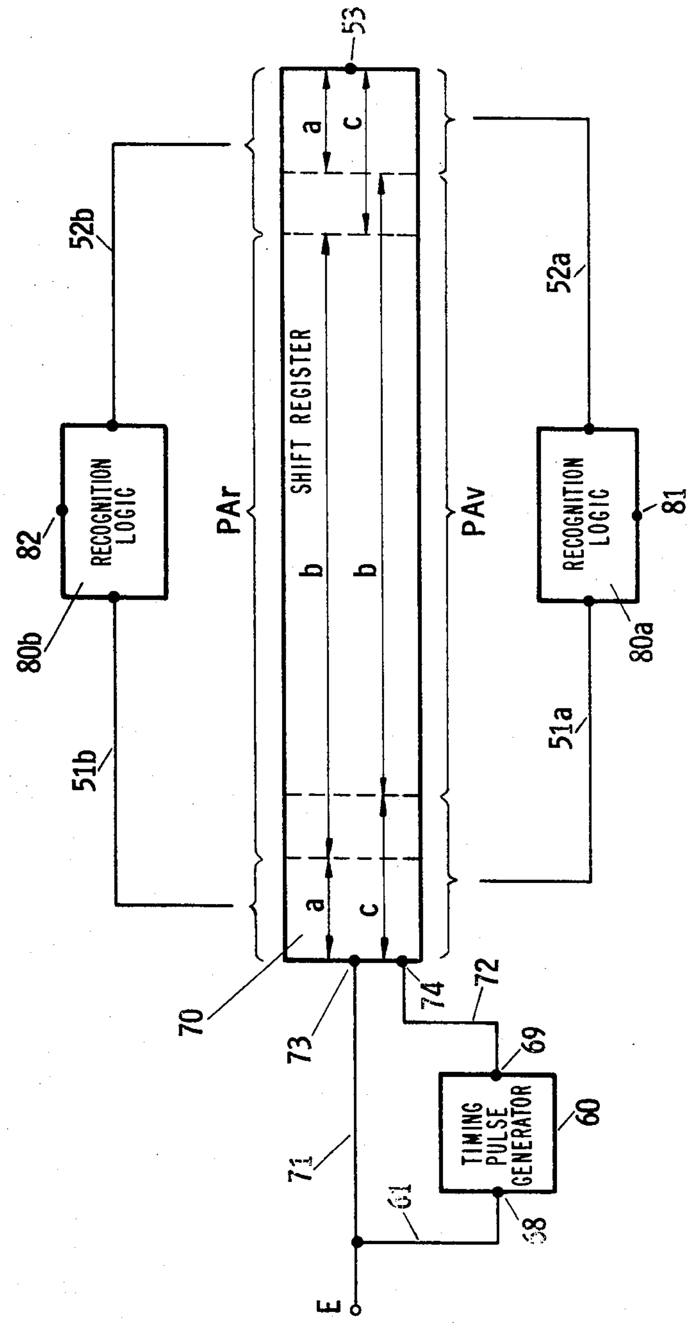

Referring to FIG. 3, a code recognition logic is connected to follow the scanning unit in order to recognize, temporarily store and mark or prepare for further evaluation those signal sequences from a number of different signal sequences delivered thereto from the scanning unit which, due to the correct path of the scanning trace producing them, have a valid configuration, i.e. the complete information content. The signal sequences or impulse sequences coming from the scanning unit which is assumed to be known and for this reason is not shown are delivered to an input E of the code recognition logic. An impulse sequence with the valid configuration consists of the starting code 25 with a bits, the information code 26 with $b$ bits and the end code 27 with $c$ bits. Overall, therefore, one impulse sequence with a valid configuration contains $a+b+c$ bits. It should be remembered in this connection that the first bit R of the starting code 25 emanates from the required white periphery of the identification.

The impulse sequences delivered to input E are transmitted through a line 71 to an input 73 of a shift register 70 having $a+b+c$ stages (i.e. the same number of stages as there are bits received). The impulse sequences delivered to the input E are also transmitted through a line 61 to an input 68 of a timing pulse generator 60. From the output 69 of the timing pulse generator 60, timing pulses which are in a fixed relation to the impulse sequence arriving at input E and at 73 are delivered through a line 72 to an input 74 of the shift register 70.

Since it is initially not known to the code recognition logic whether a delivered impulse sequence emanates from a forward scanning or from a backward scanning (cf. FIG. 1*b* and FIG. 1*c*), and since its function is to recognize every impulse sequence with the valid configuration irrespective of whether it emanates from a forward scanning or backward scanning, means for recognizing the scanning direction are associated with the shift register 70. These means include a forward recognition logic **80*a* and a backward recognition logic 80*b*. The forward recognition logic 80*a* and the backward recognition logic 80*b* together form a direction recognition logic 80**.

In operation, the storage condition of the first c stages of the shift register 70 are delivered at any time to the forward recognition logic **80*a* through a connection 51a. The storage condition of the last a stages of the shift register 70 are also delivered at any time to the forward recognition logic 80*a* through another line 52*a*** ($a$ and $b$ being equal to the number of bits in the starting and end codes).

Similarly, the storage condition of the first a stages of the shift register 70 is delivered at any time to the backward recognition logic **80*b* through a line 51*b*, while the storage condition of the last $c$ stages of the shift register 70 are delivered through another line 52*b*. During the period in which an impulse sequence with the valid configuration, emanating from a forward scanning, is stored in the shift register 70, the forward recognition logic 80*a* delivers a logical signal 1 at an output 81. Similarly, the backward recognition logic 80*b* delivers a logical signal 1 at an output 82 during the period in which an impulse sequence with the valid configuration, emanating from backward scanning, is stored in the shift register 70. If the output 81 gives a logical signal 1, the stored information code 26 is displayed in parallel at the parallel outputs $PA_v$ of the shift register 70. The information code 26** thus appears beginning with the $(c+b)$ stage backwards to the $(c+1)$ stage.

If, by contrast, the output 82 delivers a logical signal 1, the information code 26 stored in the shift register is displayed in parallel at parallel outputs $PA_r$, beginning with the $(a+1)$ stage to the $(a+b)$ stage.

In this way, the information present in the impulse sequence together with an indication of the scanning direction is available for further evaluation, as a result of which the function of the code recognition logic is basically fulfilled.

It is also possible, however, for the impulse sequence to be evaluated in series rather than in the aforementioned parallel display. In this case, it is removed in series in known manner from the output 53 of the shift register 70. In addition, the information on the scanning direction is still available at the aforementioned outputs 81 and 82. Further evaluation of the impulse sequence can be carried out, for example, in a computer and does not form any part of this invention.

As already mentioned, the code recognition logic shown in FIG. 3 is able to recognize an impulse sequence with the valid configuration irrespective of the scanning direction. In order to make subsequent evaluation of the impulse sequence easier, it has proved to be of further advantage to develop the code recognition logic in such a way as to always display recognized impulse sequences with the valid configuration in the same way at the output for example, in the way in which the logic displays for a forward scanning. This can be accomplished by a means as discussed below with reference to FIG. 7.

In order to increase the degree of certainty with which an identification is recognized, it has also proved to be of advantage to design the arrangement for scanning the indentification in such a way that at least two impulse sequences with the valid configuration are formed during the scanning of each identification. This can be achieved by suitably selecting the scanning rate and feed rate so that the information present in the identification is available twice. For reasons of safety, evaluation is only carried out when both scannings have produced the same result. By suitably selecting the scanning speed and the speed $v$ at which the identification sign is moved past a scanning unit, it is possible to have two identical impulse sequences emanate from two successive scanning traces.

Figure 3A:
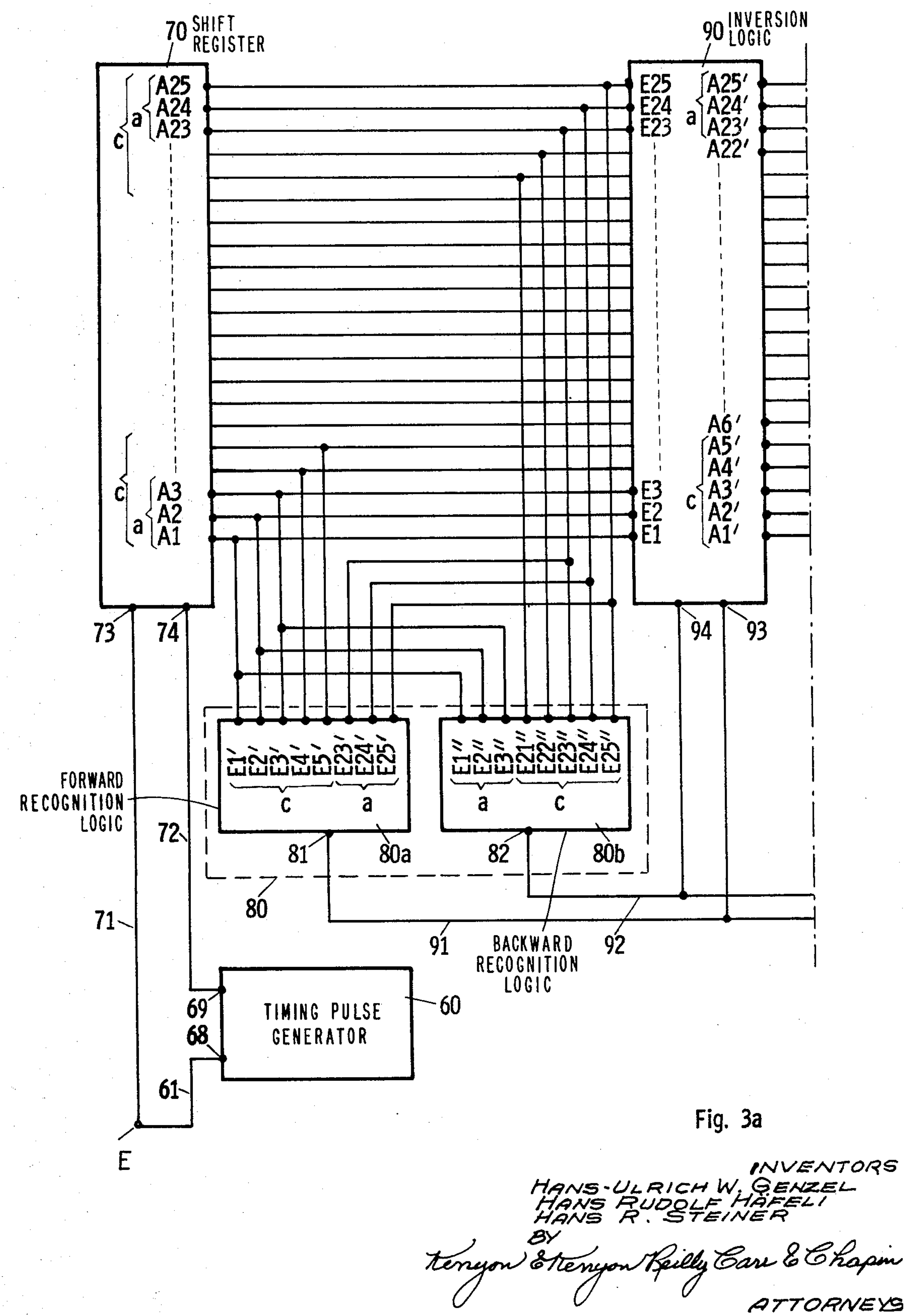
Figure 3B:
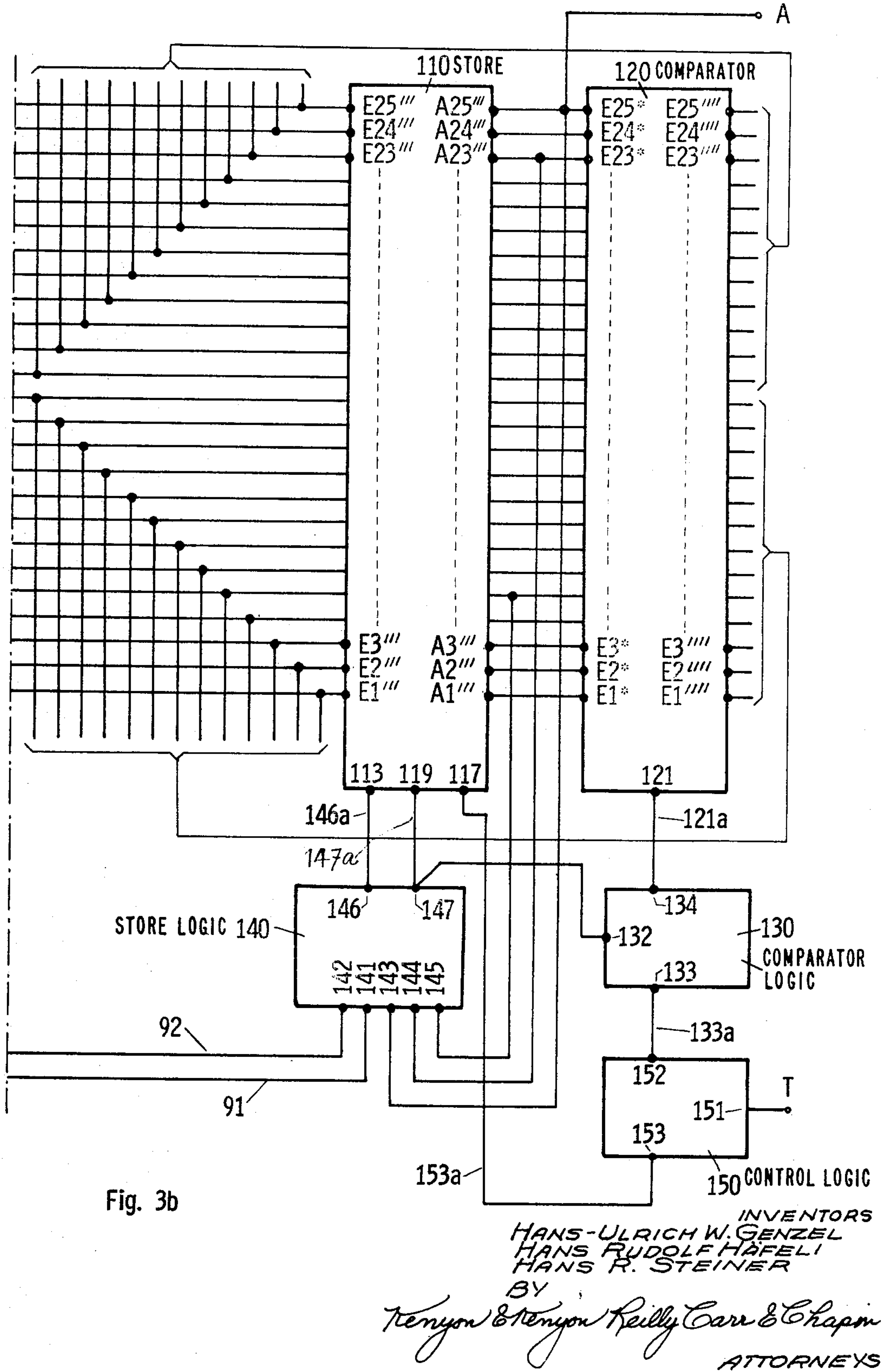

Referring to FIGS. 3*a* and 3*b*, a code recognition logic for evaluating two pulse sequences receives, as above, each impulse sequence from the scanning unit at an input E of the code recognition logic. From this input E, t-e impulse sequences are delivered on the one hand through a line 61 to the input 68 of a timing pulse generator 60 and on the other hand to the input 73 of a shift register 70. From the output 69 of the timing pulse generator 60, timing pulses related to the pulse sequence at input E are delivered through a line 72 to the input of the shift register 70.

The shift register 70 has $a+b+c$ parallel outputs, i.e., the parallel output $A_1$, $A_2 ... A_{25}$ and is connected to a direction recognition logic 80 and an inversion logic 90. Each of the parallel outputs $A_1 ... A_{25}$ is coupled with the input $E_1 ... E_{25}$ of the inversion logic 90 corresponding with its index number. In addition, each of the first c parallel outputs of the shift register 70 is coupled to the $c$ inputs $E'_1 ... E'_5$ of the forward recognition logic 80*a* with each of the first a parallel outputs of the shift register 70 also being coupled with the a inputs $E'_1 ... E'_3$ of the backward recognition logic 80*b*. Each of the last $c$ parallel outputs of the shift register 70 is also coupled to the inputs $E''_{21} ... E''_{25}$ of the backward recognition logic 80*b* with the same index number Finally, the last a parallel outputs of the shift register 70 are coupled to the inputs $E'_{23} ... E'_{25}$ of the forward recognition logic 80*a*.

As mentioned with respect to FIG. 3, a logical signal 1 only appears at the output 81 of the forward recognition logic 80*a* when an impulse sequence with the valid configuration fed into the shift register 70 emanates from a forward scanning. Similarly, a logical signal 1 only appears at the output 82 of the backward recognition logic 80*b* when an impulse sequence delivered to the shift register 70 emanates from backward scanning. These two logical signals are delivered through respective lines 91, 92 to inputs respective 93, 94 of inversion logic 90.

In operation, any impulse sequence with the correct configuration recognized by the code recognition logic always appear in the same bit sequence at the parallel outputs $A'_1$, $A'_2 ... A'_{25}$, in such a way, for example, that the starting code 25 appears at the last a outputs $A'_{25}$, $A'_{24}$, $A'_{23}$ while the end code 27 appears at the first $c$ outputs $A'_5 ... A'_1$. The information code 26 appears at the intermediate outputs $A'_{22} ... A'_6$.

The recognition logic further includes a store 110 and a comparator 120. The store 110 has inputs $E'''$ which are coupled to each of the outputs $A'_1 ... A'_{25}$ of the inversion logic 90 of the same index number while the comparator 120 has inputs $E''''$ of the same index number coupled to the same outputs of the inversion logic 90. Accordingly, an impulse sequence expressed at the outputs $A'_1 ... A'_{25}$ of the inversion logic 90 is also applied to the inputs $E'''_1 ... E'''_{25}$ of the store 110 and to the inputs $E''''_1 ... E''''_{25}$ of the comparator 120. However, this is only the case for the duration of the last bit of an impulse sequence with the correct configuration to be read. On the other hand, the impulse sequence delivered to the inputs $E'''_1 ... E'''_{25}$ remains in the store 110 for the period $\Delta T$, i.e. remains stored in the store 110 during coverage of a scanning trace, and accordingly appears at the parallel outputs $A'''_1 ... A'''_{25}$ of the store 110 and at the inputs $E^*$ with the same index number of the comparator 120. Thus, identical conditions prevail at the inputs $E^*_1 ... E^*_{25}$ of the comparator 120 and at the inputs $E''''_1 ... E''''_{25}$ for the duration of the last bit of an impulse sequence with the valid configuration to be read. The comparator 120 then generates a logical signal 1 at an output 121 as an indication of consistency for the duration $dt$ of the appearance of the last bit of an impulse sequence with the correct configuration.

The store 110 has a store logic 140 connected thereto which functions to release the store 110 for receiving input signals, to block the store 110 and, where necessary, to erase a store impulse sequence. For this purpose, the store logic 140 receives a logical signal 1 either through the line 91 or through the line 92 from the direction recognition logics 80*a*, 80*b* provided an impulse sequence with the correct configuration appears in the shift register 70. By virtue of this signal, the store 110 is released to receive an impulse sequence (displayed in parallel. The store logic 140 also contains a timing element which erases a stored impulse sequence at the end of the time interval $\Delta T$. A signal is also delivered to the store logic 140 at inputs 143, 144, 145 from certain outputs of the store 110. These certain outputs correspond, for example, to the 5th, 23rd and 25th bit of the stored impulse sequence. These bits are accommodated in the end code 27 and starting code 25 and therefore have a known predetermined value. The appearance of this value at these outputs of the store 110 is an indication that an impulse sequence of valid configuration is already stored in the store 110. Accordingly, the store logic 140 blocks the delivery of further impulse sequences at the inputs to the store 110 until the end of the time interval $\Delta T$.

The finding of the comparator 120 (logical signal 1 where the impulse sequences agree, logical signal 0 where the impulse sequences do not agree) is delivered from an output 121 through a line 121*a* to an input 134 of a comparator logic 130. It is only the second correct finding of the comparator 120 which can be regarded as confirmation of the fact that two successive impulse sequences agree with one another bit for bit. Accordingly, the comparator logic 130 associated with the comparator 120 contains a counter which only delivers a logical signal 1 at an output 133 on the occasion of the second correct finding of the comparator.

In addition, the store logic 140 is connected to the comparator logic 130 to deliver a logical signal 1 as an ERASE impulse to an input 132 of the comparator logic 130 from an output 147 of the store logic 140 when no second impulse of valid configuration has been delivered to the store 110 during the time interval $\Delta T$. This fact is communicated to the store logic 140 through the lines 91, 92 at the inputs 141 and 142. In addition, the ERASE impulse appearing at the output 147 of the store logic 140 is also delivered to an input 119 of the store 110 so that any impulse sequence stored therein is erased. A PREPARE impulse is delivered from an output 146 of the store logic 140 through a line 146*a* to an input 113 of the store 110 only if the store is still or again empty.

Finally, the code recognition logic contains a control logic 150 which is connected to the output 133 of the comparator logic 130 in order to initiate separation of the impulse sequence stored in the store 110 and found good by the comparator 120 upon receiving an output signal from the output 133 of the comparator logic 130. To this end, the output signal of the comparator logic 130 is delivered from the output 133 through a line 133*a* to an input 152 of the control logic 150. A timing pulse sequence T is also delivered to an input 151 of the control logic 150, for example, from a computer which is provided for evaluating the impulse sequence. Under the effect of the signal at the input 152, this timing pulse sequence T is delivered from the output 153 of the control logic 150 through a line 153*a* to the timing input 117 of the store 110, so that the store impulse sequence is released in series at the outputs A'''.

Figure 4:
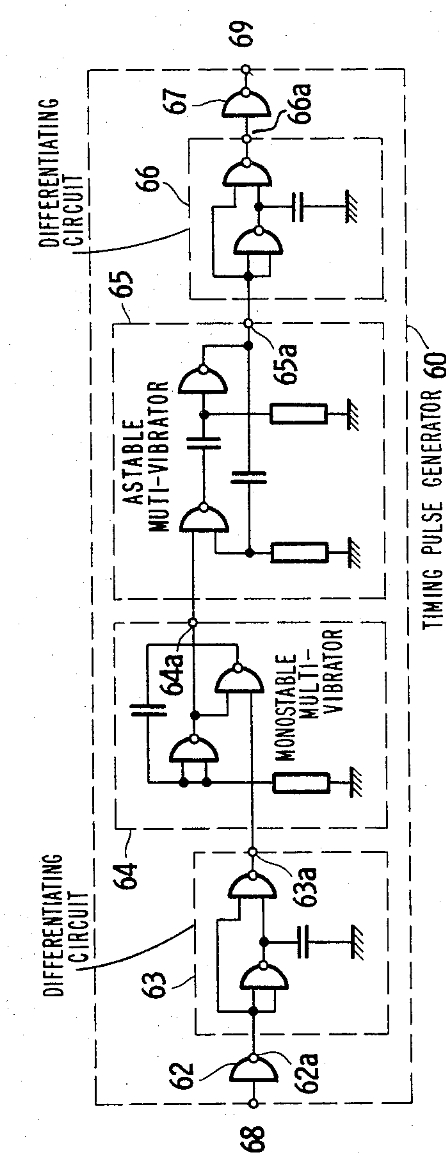
Figure 4A:
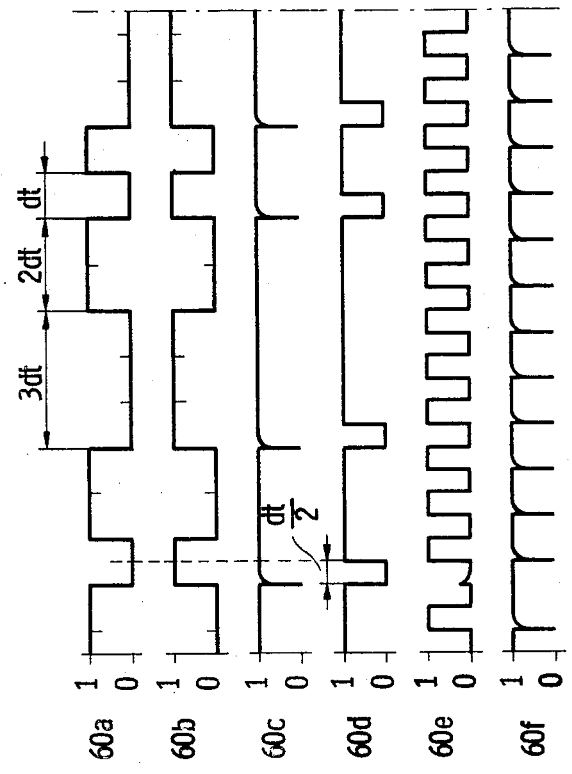

Referring to FIGS. 4 and 4*a*, the timing pulse generator 60 is constructed to function so that during the scanning of an identification sign (FIG. 1*a*), a scanning trace extending through the center of the identification sign produces an impulse sequence with impulse durations and impulse gaps of the duration *dt* or of several times this value. Part of an impulse sequence of this kind is shown for example in graph 60*a* (FIG. 4*a*). If this impulse sequence is delivered to the input 68 of the timing pulse generator 60, an inverted impulse sequence of the kind shown in graph 60*b* appears at the output 62*a* of an inverter 62. A differentiating circuit 63 with an output 63*a* is connected to the output 62*a* of the inverter 62 to produce a sharp impulse of the kind shown in graph 60*c* at the output 63*a* during each 0-1 transition of the impulse sequence shown in graph 60*b*. A monostable multi-vibrator 64 is then triggered with these sharp impulses with the impulse duration of the monostable multi-vibrator 64 being adjusted to half the duration of a bit, i.e. $(dt/2)$. The impulse sequence generated by the monostable multi-vibrator 64 at an output 64*a* is shown in graph 60*d*. It can be seen that the rising flank of the $(dt/2)$ narrow impulses always falls in the middle of an impulse gap in the impulse sequence shown in graph 60*a*. An astable multi-vibrator 65 is triggered by the impulse sequence appearing at the output 64*a* of the monostable multi-vibrator 64. The astable multi-vibrator 65 thus produces an impulse sequence of the kind shown in graph 60*e* at an output 65*a*. Accordingly, the astable multivibrator 65 is synchronized with each flank of the impulse sequence shown in graph 60*d* going from the value 1 to the value 0 with the impulse duration of the astable multi-vibrator 65 being adjusted to $(dt/2)$. The impulse sequence (cf. graph 60*e*) appearing at the output 65*a* of the astable multi-vibrator 65 is differentiated in a differentiating circuit 66 which, in turn, generates an impulse sequence of the kind shown in graph 60*f* at an output 66*a*. It can be seen from FIG. 4*a* that the impulses according to graph 60*f* always appear in the middle of impulse or impulse gaps of duration *dt*. The impulses emanating from the output 66*a* of the differentiating circuit 66 are finally delivered through an inverter 67 to the output 69 of the timing pulse generator 60.

Figure 5:
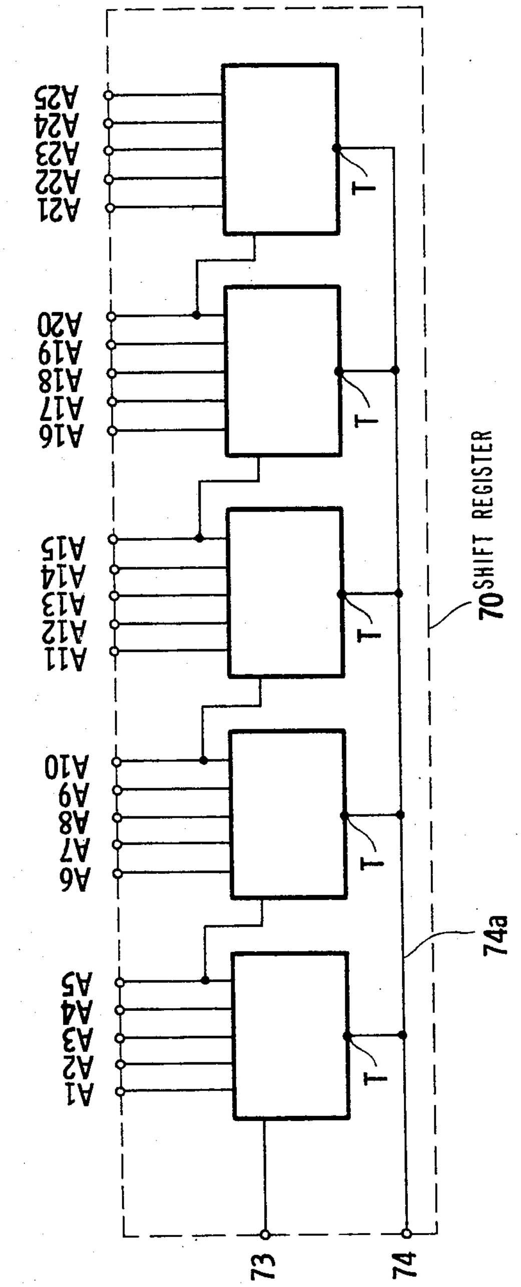
FIG. 5 illustrates a circuit diagram of a shift register used in the code recognition logic of FIGS. 3*a* and 3*b;*

Referring to FIG. 5, the shift register 70 consists, for example, of 25 stages with each of these five stages being formed by 5-bit shift register units. In operation, an impulse sequence passes from the input E of the code recognition logic through a line 71 to the series input 73 of the shift register 70. The logical condition simultaneously occurring at the input 73 is read into the first stage of the shift register 70 with each impulse of the timing pulse sequence (from the timing pulse generator 60) occurring at the input 74 of the shift register. At the same time, all the conditions in the 25 stages are shifted one step further. The particular logical condition in each of the 25 stages is available at the 25 parallel outputs $A_1$ to $A_{25}$ of the shift register 70. The timing pulses delivered to the input 74 are fed through a line 74*a* to the timing inputs T of the shift register stages.

Figure 6:
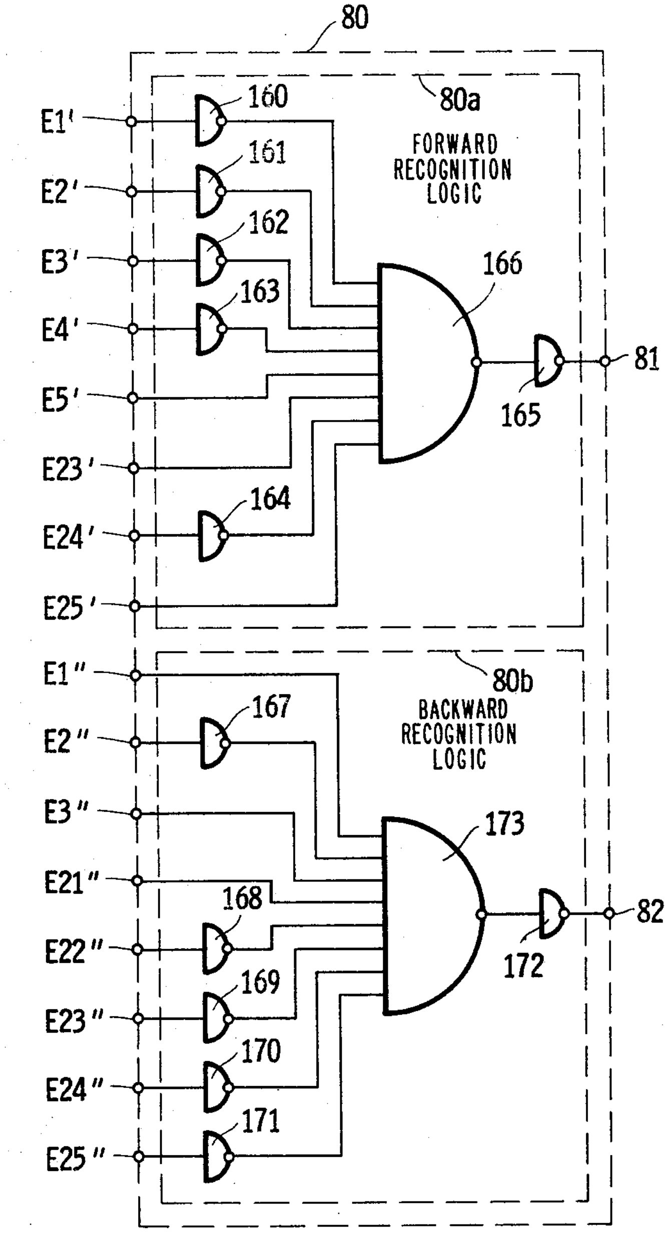
FIG. 6 illustrates a circuit diagram of one embodiment of a direction recognition logic according to the invention.

Referring to FIG. 6, the direction recognition logic 80 functions to recognize from the number of impulse sequences arising out of the groups of scanning traces those impulse sequences which have the valid configuration with an indication of the scanning direction. The direction recognition logic 80 is divided up into a forward recognition logic 80*a* and into a backward recognition logic 80*b*. If an impulse sequence of valid configuration emanating from a forward scanning is delivered to the shift register 70, the first *c* and the last *a* stages of the shift register 70 show very specific conditions. These conditions are determined by the bit sequence of the starting code 25 and end code 27. The outputs $A_1...A_5$ and $A_{23}...A_{25}$ are associated with the inputs $E'_1...E'_5$ and $E'_{23}...E'_{25}$ of the forward recognition logic 80*a*. In the embodiment under discussion, the logical signals 0 and 1 are supplied to the aforementioned inputs by virtue of the assumed starting code 26 and end code 27. These signals are combined in an octupal NAND gate 166. On account of the differing value (0 or 1) of the signals arriving at the inputs $E'_1...E'_5$ and $E'_{23}...E'_{25}$, those which have the value 0 are inverted in inverters 160 to 164 before they are delivered to the NAND gate 166. The output signal of the NAND gate 166 is delivered through an inverter 165 to the output 81 of the direction recognition logic.

On the arrival of an impulse sequence with the valid configuration emanating from a backward scanning, the first *a* and the last *c* stages of the shift register 70 show extremely specific conditions. These conditions are determined by the bit sequence of the starting code 25 and end code 27. The outputs $A_1...A_3$ and $A_{21}...A_{25}$ of the shift register 70 are coupled to the inputs $E''_1...E''_3$ and $E''_{21}...E''_{25}$ of the backward recognition logic 80*b*. In the embodiment under discussion, the logical signals 0 or 1 corresponding to the starting code 25 or end code 27 selected are applied to the aforementioned inputs in the case of an input sequence read into the shift register 70 which emanates from backward scanning. These signals are combined in an octupal NAND gate 173. Due to the differing values (0 or 1) of the signals reaching the aforementioned inputs, those which have the values 0 are inverted in inverters 167...171 before being delivered to the NAND gate 173. The output signal of the NAND gate 173 is delivered through an inverter 172 to the output 82 of the direction recognition logic. As a result of this logical relationship between the aforementioned signals, a logical signal with the value 1 appears at the output 81 in the event of an impulse sequence of valid configuration emanating from a forward scanning, while a logical signal with a value 1 appears at the output 82 in the event of an impulse sequence emanating from a backward scanning.

Figure 7:
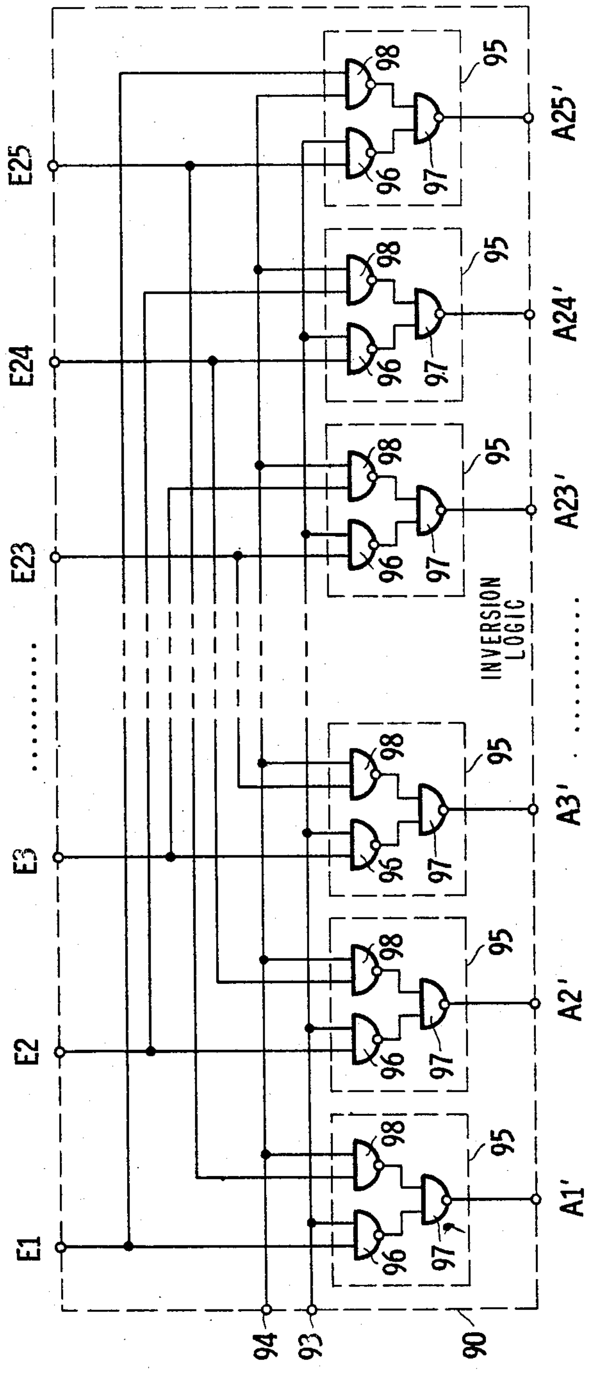
FIG. 7 illustrates a circuit diagram of one embodiment of an inversion logic according to the invention.

Referring to FIG. 7, the inversion logic 90 functions to invert an impulse sequence optionally emanating from a backward scanning as if the corresponding scanning trace had been scanned in the forward direction. It is assumed that the impulse sequences are available in parallel display both at the input end and at the output end. Accordingly, a certain impulse sequence either in the bit sequence 1 to 25 or 25 to 1 arrives at the inputs $E_1...E_{25}$. If the impulse sequence arriving at the inputs $E_1...E_{25}$ emanated from a forward scanning, this impulse sequence is intended to appear in the same bit sequence at the outputs $A'_1...A'_{25}$. If by contrast the impulse sequence arriving at the inputs $E_1...E_{25}$ emanated from a backward scanning, this impulse sequence is intended to appear in opposite bit sequences at the outputs $A'_1...A'_{25}$.

A cut-through stage 95 is associated with each of the outputs $A'_1...A'_{25}$ and each stage 95 has two input NAND gates 96,98 and one output NAND gate 97. In the presence of an impulse sequence emanating from a forward scanning, the input 93 generates a logical signal 1 as above mentioned. All the NAND gates 96 in the cut-through stages 95 are then activated by this logical signal. Another input of each NAND gate 96 is connected to the input $E_1...E_{25}$. Accordingly, in the case of forward scanning, a signal is delivered from the input $E_1$ to the NAND gate 96 into the first cut-through stage 95 and through the NAND gate 96 and the NAND gate 94 to the output $A'_1$. Similarly, a signal is delivered from the input $E_2$ through the second cut-through stage 97 to the output $A'_2$, and so forth through the remaining inputs E.

If by contrast an impulse sequence emanating from backward scanning arrives at the inputs $E_1...E_{25}$, the input 94 delivers a logical signal as above mentioned. Accordingly, the input NAND gate 98 in the cut-through stages 95 is activated. The other input of each NAND gate 98 is coupled "cross over-fashion" to the inputs $E_1...E_{25}$, in other words the other input of the NAND gate 98 in the first cut-through stage is coupled to the input $E_{25}$, while the other input of the NAND gate 98 in the second cut-through stage 95 is coupled to the input $E_{24}$ and so forth. In the case of a backward scanning, a signal is delivered from the input $E_{25}$ to the output $A'_1$ and a signal from the input $E_{24}$, to the output $A_2$ and so forth.

Figure 8:
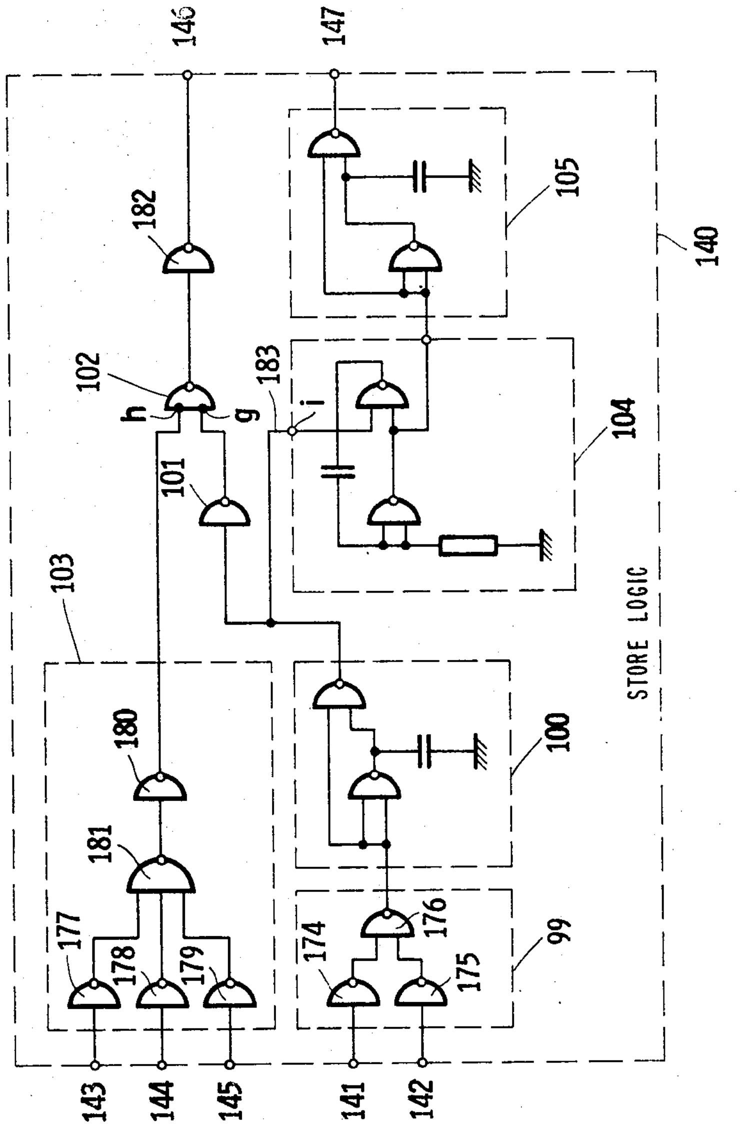
FIG. 8 illustrates a circuit diagram of one embodiment of a storage logic according to the invention.

Referring to FIG. 8, the store logic 140 is associated with a store 110 in order to monitor the condition of the store 110 and to erase and release the store 110. If the code recognition logic 80 has recognized an impulse sequence of valid configuration, a logical signal 1 arrives either at the input 141 or at the input 142 of the store logic 140 depending upon the scanning direction from which the impulse sequence in question has originated. The accommodation of the NAND gates 174, 175 and 176 represents an OR gate 99. A logical signal appears at the output of the NAND gate 176 every time an impulse sequence of correct configuration, irrespective of the scanning direction, is present. A short negative impulse is generated from a rising flank of the output signal of the OR gate 99 in a differentiating circuit 100. This negative impulse is inverted in an inverter 101 and delivered as a positive impulse to an input g of a NAND gate 102. In addition, the inputs 143, 144, and 145 of the store logic 140 are coupled to specific stages at the output end of the store 110 so as to monitor the storage condition of the store 110 at these specific stages, e.g. at the outputs $A''_5$, $A''_{23}$ and $A''_{25}$. For an impulse sequence of valid configuration exactly defined bits of the starting code 25 and end code 27 lie at the aforementioned outputs. Accordingly, it is known in advance whether a logical signal 1 or a logical signal 0 is present at the outputs in question provided that an impulse sequence of valid configuration is stored. If the store 110 is either empty or erased, a logical signal 0 is present at the inputs 143, 144, 145. In this case, an AND circuit 103 consisting of inverters 177, 178, 179 and a triple NAND gate 181 and another inverter 180, delivers a logical signal 1 to an input *h* of the NAND gate 102. The effect of this, in conjunction with the signal already present in its input *g*, is that the NAND gate 102 delivers a logical signal 0 to an inverter 182. The output 146 which is coupled to the output of the inverter 182 then generates a logical signal 1. This logical signal 1 is delivered through a line **146*a* to the CLEAR input 113 of the store 110** (cf. FIG. 3*b*).

In addition, the negative impulse from the differentiating circuit 100 is also delivered through a line 183 to an input *i* of a monostable multi-vibrator 104. The impulse duration of this monostable multi-vibrator 104 amounts to $\Delta$ T. The output of the monostable multi-vibrator 104 controls the input of a differentiating circuit 105. At the end of the time interval $\Delta$T, a negative impulse appears at the output 147 of the storage logic. This negative impulse is delivered through a line **147*a* to an ERASE input 119 of the store 110** (cf. FIG. 3*b*). Thus, at the end of time interval $\Delta$ T, an impulse sequence which has been read in is always erased again by the negative impulse delivered to the ERASE input 119 of the store 110 at the end of time interval $\Delta$ T.

Figure 9:
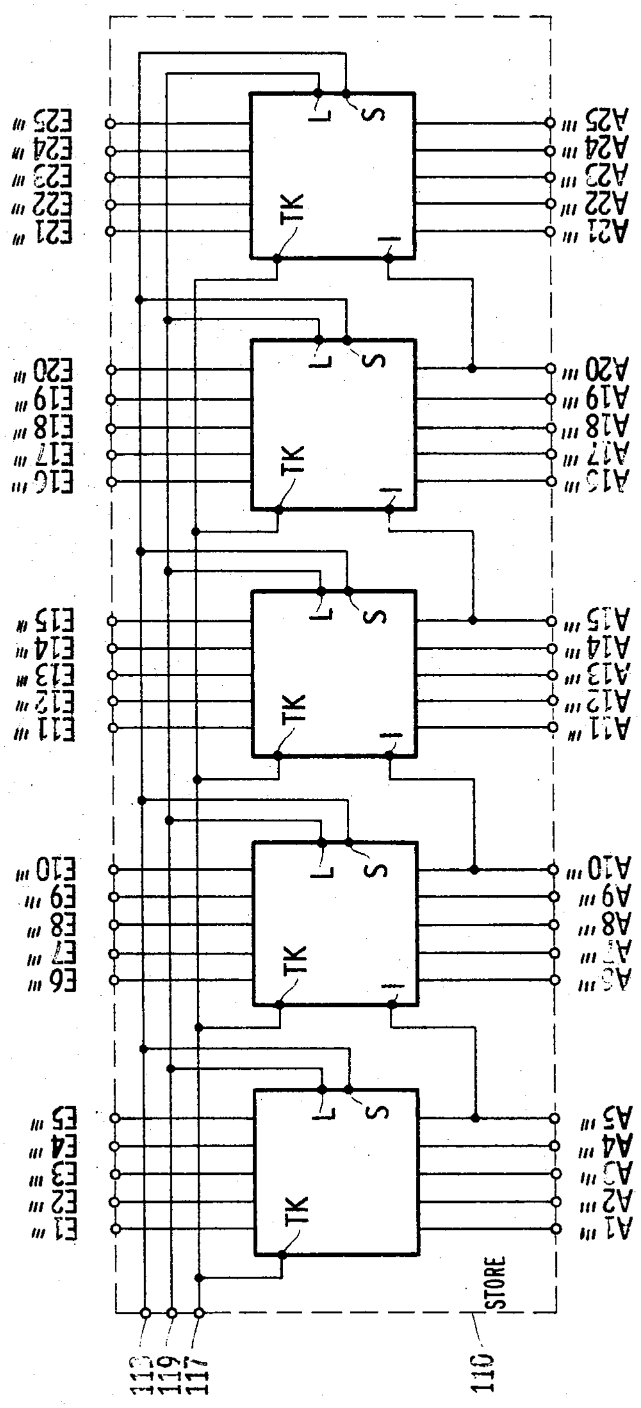
FIG. 9 illustrates a circuit diagram of one embodiment of a store according to the invention.

Referring to FIG. 9, the store 110 is built of 5 units of 5-bit shift registers which afford the possibility of parallel reading-in. In operation, a parallel read-in command is transmitted from the output 146 of the store logic 140 through a line **146*a* to the CLEAR input 113 of the store 110 (c.f. FIG. 3) and hence to the PREPARE inputs of the store stages. The impulse sequence present in the inputs $E'''_1$...$E'''_{25}$ is read into the store 110 during the residence time of the positive impulse of the input 113**. Providing it is not erased, this impulse sequence is available in parallel display at the outputs $A'''_1$...$A'''_{25}$.

If it is intended to erase the stored impulse signals, a negative impulse is required. This negative impulse is generated in the store logic 140. It passes through the output 147 at the lines **147*a* to the input 119 of the store 110 and hence to the ERASE inputs of the store stages. If the store impulse sequence is to be further processed, a timing pulse sequence T is delivered to the store 110. This timing pulse sequence T is delivered from the control logic 150 through the line 153*a* (cf. FIG. 3b) to the input 117 of the store 110. The stored impulse sequence is read out in series at the output $A'''_{25}$ under the effect of this timing pulse sequence T. In order to enable the impulse sequence to be read out in series, the last stage of each 5-bit shift register is coupled with the series input of the next 5-bit shift register (cf. FIG. 9**). The remaining structure of the shift register is of known construction and need not be further described.

Figure 10:
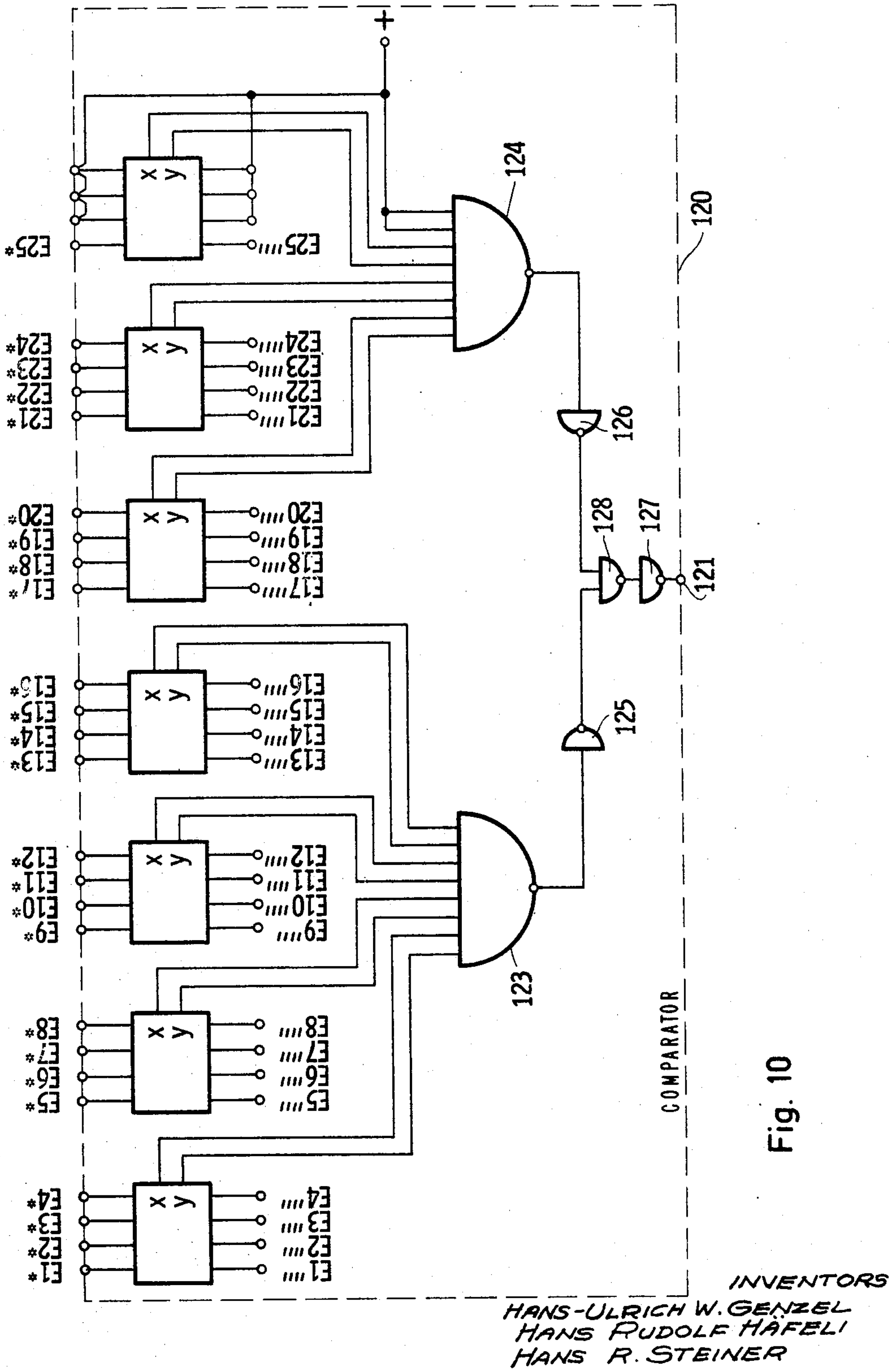
FIG. 10 illustrates a circuit diagram of one embodiment of a comparator according to the invention.

Referring to FIG. 10, the comparator consists of 7 units of 4-bit comparators. The parallel inputs $E^*_1$...$E^*_{25}$ of the comparator 120 are coupled to the parallel outputs $A'''_1$...$A'''_{25}$ of the store 110 (cf. FIG. 3*b*) while the parallel inputs $E''''_1$...$E''''_{25}$ are coupled to the parallel outputs $A'_1$...$A'_{25}$ of the inversion logic 90 (cf. FIG. 3b). If all 25 stages of the comparator 120 are consistent with one another, one logical signal 1 appears at each of the *x*- and *y*-outputs of the 7 DM 8200N comparator units. The combination of the gates 123...128 forms an AND gate with 16 inputs. A signal with the value 1 only appears at the output 121 of the comparator 120 when consistency prevails among all 25 stages.

Figure 11:
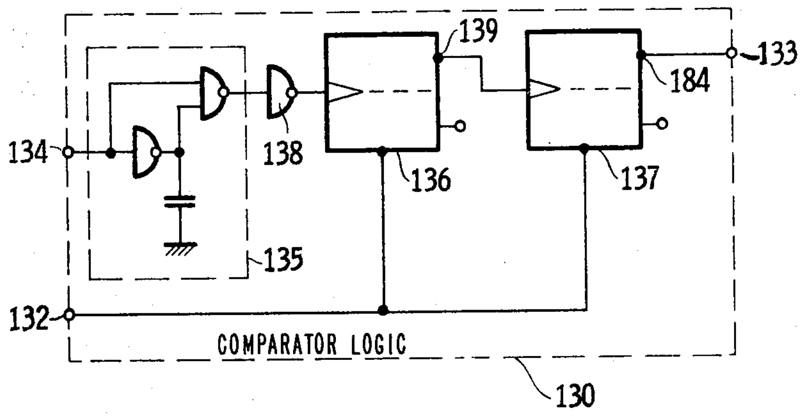
FIG. 11 illustrates a circuit diagram of one embodiment of a comparator logic according to the invention.

Referring to FIG. 11, the comparator logic 130 functions to indicate a final GOOD finding of the comparator 120 to the control logic 150. In operation, the comparator 120 is able to deliver a logical signal 1 during only the first reading-in of an impulse sequence of correct configuration. However, this in itself does not represent a GOOD finding for the comparison of two successively read impulse sequences. It is only a second GOOD finding which represents confirmation of the fact that two successive readings of the identification have lead to two identical impulse sequences of valid configuration. Accordingly, the purpose of the comparator logic 130 is to suppress the first finding of the comparator 120.

The output 121 of the comparator 120 is connected through a line **121*a* to an input 134 of the comparator logic 130** (cf. FIG. 3*b*). The signals of the comparator 120 are initially delivered to a differentiating circuit 135 of the comparator logic 130. Thereafter, for each GOOD finding of the comparator 120, a negative impulse converted through an inverter 138 into a positive impulse appears at the output of this differentiating circuit 135. A short positive impulse from the output of the inverter 138 places an output 139 of a first flip-flop 136 in the logical state 1. The output 184 of a second flip-flop 137 following the first flip-flop 136 is only placed in the logical state 1 on the arrival of the second positive impulse at the output of the inverter 138. The combination of the flip-flops 136, 137 represents a two stage binary counter. A logical signal 1 only appears at the output 133 of the comparator logic 130 when two identical impulse sequences of valid configuration have been delivered to the code recognition logic. If however, the second impulse sequence of valid configuration does not appear within the time interval $\Delta$ T, the flip-flops 136, 137 are returned to their zero position. The impulse required for this purpose is generated in the store logic 140 and passes through the output 147 of the store logic 140 to the input 132 of the comparator logic 130 (cf. FIG. 3*b*).

Figure 12:
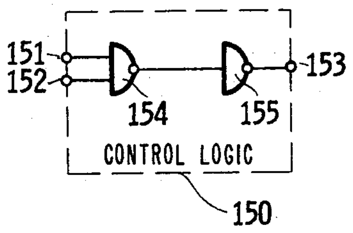
FIG. 12 is a circuit diagram of one embodiment of a control logic according to the invention.

Referring finally to FIG. 12, the control logic 150 consists of a 2-input NAND gate 154 and an inverter 155. An input 151 of the control logic 150 is connected to an external timing source which delivers an impulse sequence T (cf. FIG. 3b). An input 152 of the control logic 150 only receives a logical signal 1 when the comparator logic 130 has detected two impulse sequences of valid configuration within the time interval $\Delta$ T. Once this condition has been satisfied, the timing pulse sequence T passes from the input 151 through the NAND gate 154 and the inverter 155 to the output 153. The timing pulse sequence T is then transmitted through the line **153*a* to the timing input 117 of the store 110** (cf. FIG. 3*b*), thus initiating series reading of an impulse sequence stored in the store 110.

The method according to the invention and an apparatus according to the invention enables the dimensions of an identification sign used to identify articles to be drastically reduced in comparison with conventional identification signs. For example, instead of a known identification sign occupying a whole circular area, it is possible to use only part of this circular area, for example, about half or even about a quarter thereof, in an arrangement in which knowledge of the bit sequence which is essential for evaluating the impulse sequences is obtained on completion of scanning from the position of certain code portions within the impulse sequences by means the direction recognition logic 80.

The invention further provides a marking for an identification sign containing the full information content to be covered which does not require special alignment for a reader. Also, by virtue of the configuration of the marking in conjunction with the code recognition logic following the reader, it is possible for a given resolving power of marking and reader to considerably reduce the space required to accommodate the marking.

The identification signs according to the invention are distinguished by the fact that the markings present therein for displaying information, for example, a starting code, an information code and an end code, are equidistantly arranged. In the case of an identification sign to be scanned by optical means, these markings can be in the form of equidistant linear patterns printed with high contrast onto the articles to be identified on their wrappings. The tolerance which have to be adhered to in order to obtain equidistance are derived in known manner from the properties of the scanning unit employed. Linear patterns of this kind consist, for example, of bundles of equidistant, straight, bent or curved lines. Information can be displayed in binary form through their special arrangement and/or width or through the size of the gap between adjacent lines.

Identification signs can also be displayed divided into two or more parts.

What is claimed is:

1. In a method of identifying an article having an identification sign containing at least one code portion and information of the article thereon, the steps comprising moving the article through a scanning path of a scanning unit with said identification sign moving through said scanning path in a non-parallel path relative to said scanning path, scanning said identification sign within said scanning path in at least one direction of a forward direction and a backward direction of said scanning path to produce a series of signals corresponding to different scanned portions of said identification sign, recognizing at least one of said signals as a valid signal of the information stored in said identification sign from a predetermined position of said code portion in said signal, and releasing said valid signal as a signal representative of the information stored in said identification sign for subsequent evaluation.

2. In a method as set forth in claim 1 wherein the information stored in said identification sign is displayed in binary code in the form of lines with the width of each line being equal to the width of a space between adjacent lines.

3. In a method as set forth in claim 2 wherein the lines extend within a sector having an opening angle $\alpha$ selected in accordance with the equation $$\alpha = 180°/n + k$$

$n$ being the number of scanning paths and $k$ an additive constant corresponding to the width of a scanning trace in said scanning path.

4. In a method as set forth in claim 1 which further comprises the steps of storing a first valid signal prior to said step of releasing, and releasing said first valid signal in response to the recognition of a second consecutive signal as a valid signal.

5. In a method as set forth in claim 1 wherein consecutive signals are received from successive scannings of a forward direction and a backward direction which further comprises the step of inverting the signals from backward direction scannings to have said backward direction scanning signals appear as forward direction scanning signals.

6. In a method of identifying an article the steps comprising applying an identification sign having a starting code, an information code containing information of the article and an end code on the article;

moving the article through a scanning path of a scanning unit producing a series of scanning traces in said path to pass said identification sign through said path in a non-parallel path to said scanning traces;

generating an impulse sequence for each said trace corresponding to a portion of said identification sign traversed by each said trace;

monitoring each generated impulse sequence with respect to said starting code and said end code to recognize at least one impulse sequence as a valid configuration of the information stored in said identification sign when said starting code and said end code are in a predetermined position;

releasing the impulse sequence recognized as a valid configuration for subsequent evaluation.

7. In a method as set forth in claim 6 wherein said identification sign is formed of a plurality of lines in binary code and a center point, each line being of a width equal to the space between adjacent lines and equal to a bit length, and said center point being of a width equal to a multiple of said bit length.

8. In an apparatus for identifying an article having an identification sign thereon, a scanning unit for scanning a predetermined path;

means for moving an article past said scanning unit with said identification sign thereon passing through said path in non-parallel relation thereto to permit said scanning unit to produce a series of signals corresponding to different portions of the scanned identification sign;

a code recognition logic connected to said scanning unit for receiving said signals therefrom to recognize at least one of said signals as a valid configuration of the information contained in said identification sign; and a direction recognition logic connected to said code recognition logic for recognizing the direction of scanning of said scanning unit corresponding to each said signal.

9. In an apparatus as set forth in claim 8 wherein said code recognition logic includes a shift register for receiving said signals, said shift register having a plurality of stages therein to receive portions of each said signal, at least a predetermined number of said stages being connected to said direction recognition logic whereby in the presence of a signal of valid configuration in said shift register said predetermined number of stages receive predetermined code portions of said signal.

10. In an apparatus as set forth in claim 9 wherein said identification sign contains a starting code of $a$ bits, an information code of $b$ bits containing the information of the article and an end code of $c$ bits, and wherein said direction recognition logic includes a forward recognition logic and a backward recognition logic; said shift register have a total of $a + b + c$ stages with the first $c$ and the last $a$ stages of said shift register being linked to said forward recognition logic and the first $a$ and the last $c$ stages being linked to said backward recognition logic.

11. In an apparatus as set forth in claim 9 wherein said code recognition logic further includes a timing pulse generator for receiving said signals from said scanning unit and connected to a shift impulse input of said shift register to deliver timing impulses thereto in correspondnece with the impulses of said signal received in said shift register from said scanning unit.

12. In an apparatus as set forth in claim 11 wherein said identification sign contains a plurality of bits said signal is an impulse sequence and said timing pulse generator includes a monostable multi-vibrator for synchronizing by the flanks of a received impulse sequence for an impulse width equal to half the width of a bit, an astable multi-vibrator for synchronizing by the flanks of a received impulse sequence for an impulse width equal to half the width of a bit, an astable multi-vibrator connected to said monostable multi-vibrator for triggering thereby, and a differentiating circuit for producing a timing pulse sequence of a duration equal to the time of a bit with impulses offset in time by half the time of a bit relative to said flanks.

13. An apparatus as set forth in claim 9 further comprising an inversion logic having a plurality of cut-through stages including a pair of input NAND gates and an output NAND gate connected to the output of said pair of input NAND gates, one of said pair of NAND gates of each cut-through stage having a first input connected to the output of a respective stage of said shift register and a second input connected to the output of one of said backward and forward direction logics, said other of said pair of NAND gates having a first input connected to the output of a respective opposite stage of said shift register in cross-wise relation and a second input connected to the output of the other of said backward and forward direction logics.

14. In an apparatus as set forth in claim 8 further comprising a store connected to said code recognition logic for storing a signal of valid configuration, a comparator connected to said code recognition logic and said store for comparing a signal of valid configuration with the signal stored in said store, a comparator logic connected to said comparator to receive a logical signals therefrom corresponding to the comparison of signals of valid configuration in said store and said comparator, and a control logic connected between said comparator logic and said store to receive a signal from said comparator logic in response to the detection of two signals of valid configuration within a predetermined time and to initiate a read-out of signals from said store in response to said signal from said comparator logic.

15. In an apparatus as set forth in claim 8 wherein said means for moving includes a pair of spaced apart conveyors positioned on opposite sides of said scanning unit.

16. In an apparatus as set forth in claim 8 wherein said means for moving includes three mutually spaced conveyors with each of a pair of said scanning units positioned between a respective pair of conveyors to provide two of said scanning paths.

17. In an apparatus as set forth in claim 16 wherein said scanning paths are disposed at right angles to each other.

18. A marking for application to an article to be automatically scanned in a information retrieval system comprising a plurality of lines displaced in binary code to contain information of the articles, each line having a width equal to the spacing between adjacent lines and each line extending within a sector having an opening angle equal to $180°/n + k$, where $n$ equals the number of scanning directions and $k$ equals the width of a scanning trace moving in said scanning directions.

19. A marking as set forth in claim 18 wherein said lines are curved.

20. A marking as set forth in claim 18 further including a center point of a diameter greater than the width of a single one of said lines, said lines being curved about said center point.

21. A marking as set forth in claim 18 wherein a number of the first of said lines is a starting code, and a number of the last of said lines is an end code with the remainder of said lines forming an information code containing the information of the article.

* * * * *